United States Patent
Tanchenko (10) Patent No.: US 10,009,611 B2
(45) Date of Patent: Jun. 26, 2018

(54) VISUAL QUALITY MEASURE FOR REAL-TIME VIDEO PROCESSING

(71) Applicant: Synopsys, Inc., Mountain View, CA (US)

(72) Inventor: Alexander Tanchenko, Gatchina (RU)

(73) Assignee: Synopsys, Inc., Mountain View, CA (US)

( * ) Notice: Subject to any disclaimer, the term of this patent is extended or adjusted under 35 U.S.C. 154(b) by 281 days.

(21) Appl. No.: 15/093,741

(22) Filed: Apr. 8, 2016

(65) Prior Publication Data

US 2016/0227220 A1    Aug. 4, 2016

Related U.S. Application Data

(63) Continuation of application No. 13/451,413, filed on Apr. 19, 2012, now Pat. No. 9,338,463.

(30) Foreign Application Priority Data

Oct. 6, 2011 (RU) .................................. 2011140632

(51) Int. Cl.
*H04N 7/12* (2006.01)
*H04N 19/154* (2014.01)
*H04N 19/176* (2014.01)
*H04N 19/147* (2014.01)
*H04N 19/103* (2014.01)
*H04N 19/60* (2014.01)

(52) U.S. Cl.
CPC ......... *H04N 19/154* (2014.11); *H04N 19/103* (2014.11); *H04N 19/147* (2014.11); *H04N 19/176* (2014.11); *H04N 19/60* (2014.11)

(58) Field of Classification Search
CPC .. H04N 19/154; H04N 19/103; H04N 19/147; H04N 19/176; H04N 19/60
See application file for complete search history.

(56) References Cited

U.S. PATENT DOCUMENTS 5,265,180 A    11/1993    Golin
5,664,057 A    9/1997    Crossman et al.
(Continued)

OTHER PUBLICATIONS

United States Office Action, U.S. Appl. No. 13/451,413, dated Oct. 7, 2015, 9 pages.
(Continued)

*Primary Examiner* — Nhon Diep
(74) *Attorney, Agent, or Firm* — Fenwick & West LLP (57) ABSTRACT

A measure of visual quality of processed images relative to unprocessed images is generated in real-time. The measure of visual quality closely correlates with a human's actual perception of the processed image relative to the original image. The measure of visual quality is computed based on a measure of discrepancy (e.g., mean square errors) between the processed and unprocessed images and the variance of each image in the pixel domain or the transform domain may be determined. If the processed image is unavailable, a prediction of the processed image may be used in place of the processed image. The prediction of a processed image may involve predicting the variance values for processed image blocks. The visual quality measure may be used in a feedback loop to improve processing or encoding.

21 Claims, 7 Drawing Sheets

(56) References Cited

U.S. PATENT DOCUMENTS

| | | | |
|---|---|---|---|
| 5,691,770 A | 11/1997 | Keesman et al. | |
| 5,724,099 A * | 3/1998 | Hamdi | G06T 9/007 |
| | | | 348/466 |
| 5,768,436 A | 6/1998 | Keesman | |
| 5,778,192 A | 7/1998 | Schuster et al. | |
| 5,832,131 A | 11/1998 | Choo et al. | |
| 6,084,908 A | 7/2000 | Chiang et al. | |
| 6,704,455 B1 | 3/2004 | Yamazaki et al. | |
| 7,899,263 B2 | 3/2011 | Li et al. | |
| 8,014,447 B2 | 9/2011 | Hinz et al. | |
| 8,064,635 B2 * | 11/2011 | Baudry | G06T 1/0028 |
| | | | 375/240.2 |
| 8,115,804 B2 | 2/2012 | Yang | |
| 8,149,918 B2 | 4/2012 | Seok et al. | |
| 8,184,164 B2 * | 5/2012 | Yang | G06T 1/0028 |
| | | | 348/180 |
| 8,351,723 B2 | 1/2013 | Richter | |
| 8,510,458 B2 * | 8/2013 | Nassor | H04N 21/23655 |
| | | | 709/231 |
| 8,594,187 B2 | 11/2013 | Chen et al. | |
| 8,934,543 B2 * | 1/2015 | Yu | H04N 19/147 |
| | | | 375/240.12 |
| 9,774,848 B2 * | 9/2017 | Jayant | H04N 19/00 |
| 9,807,431 B2 * | 10/2017 | Hannuksela | H04N 21/23614 |
| 2004/0006644 A1 | 1/2004 | Henocq et al. | |
| 2004/0120397 A1 | 6/2004 | Zhang et al. | |
| 2004/0131121 A1 | 7/2004 | Dumitras et al. | |
| 2005/0157784 A1 | 7/2005 | Tanizawa et al. | |
| 2006/0098733 A1 | 5/2006 | Matsumura et al. | |
| 2006/0133479 A1 | 6/2006 | Chen et al. | |
| 2006/0133481 A1 | 6/2006 | Chujoh | |
| 2006/0188014 A1 | 8/2006 | Civanlar et al. | |
| 2007/0036213 A1 | 2/2007 | Matsumura et al. | |
| 2007/0064793 A1 | 3/2007 | Wang et al. | |
| 2007/0140334 A1 | 6/2007 | Sun | |
| 2007/0153982 A1 | 7/2007 | Bloebaum | |
| 2007/0171728 A1 | 7/2007 | Cho | |
| 2008/0056354 A1 | 3/2008 | Sun et al. | |
| 2008/0063051 A1 | 3/2008 | Kwon et al. | |
| 2008/0212677 A1 | 9/2008 | Chen et al. | |
| 2010/0166251 A1 | 7/2010 | Baudry et al. | |
| 2010/0238997 A1 | 9/2010 | Yang et al. | |
| 2011/0007968 A1 | 1/2011 | Yamada | |
| 2011/0043604 A1 | 2/2011 | Peleg et al. | |
| 2011/0103473 A1 | 5/2011 | Li et al. | |
| 2011/0142124 A1 | 6/2011 | Huang et al. | |
| 2011/0194615 A1 | 8/2011 | Zheludkov et al. | |
| 2012/0201475 A1 * | 8/2012 | Carmel | H04N 19/172 |
| | | | 382/238 |
| 2014/0119432 A1 * | 5/2014 | Wang | H04N 19/00078 |
| | | | 375/240.2 |

OTHER PUBLICATIONS

Wiegand, T. et al., "Overview of the H.264/AVC Video Coding Standard," IEEE Transactions on Circuits & Systems for Video Technology, Jul. 2003, pp. 560-576, vol. 13, No. 7.

Jiang, M. et al., "On Lagrange Multiplier and Quantizer Adjustment for H.264 Frame-Layer Video Rate Control," IEEE Transactions on Circuits & Systems for Video Technology, May 2006, pp. 663-669, vol. 16, No. 5.

Sullivan, G.J. et al., "Rate-Distortion Optimization for Video Compression," IEEE Signal Processing Magazine, Nov. 1998, pp. 74-90.

Ma, S. et al., "Rate Control for Advance Video Coding (AVC) Standard," II Proceedings of the 2003 Int'l Symposium on Circuits & Systems (ISCAS '03), May 2003, pp. 892-895.

Kannangara, C.S. et al., "Low-Complexity Skip Predication for H.264 Through Lagrangian Cost Estimation," IEEE Transactions on Circuits & Systems for Video Technology, Feb. 2006, pp. 202-208, vol. 16, No. 2.

Wiegand, T. et al., "Lagrange Multiplier Selection in Hybrid Video Coder Control," Proceedings of 2001 Int'l Conf. on Image Processing, Oct. 2001, pp. 542-545.

\* cited by examiner

VISUAL QUALITY MEASURE FOR REAL-TIME VIDEO PROCESSING

CROSS REFERENCE TO RELATED APPLICATIONS

This application is a continuation of U.S. patent application Ser. No. 13/451,413, filed Apr. 9, 2012, now issued as U.S. patent Ser. No. 9,338,463, which in turn claims the right of priority based on Russian application serial no. 2011140632, filed Oct. 6, 2011, both of which are incorporated by reference herein in their entirety. This application is related to U.S. patent application Ser. No. 13/448,224, titled "Rate Distortion Optimization in Image and Video Encoding", filed on Apr. 16, 2012, which in turn claims the right of priority based on Russian application serial no. 2011140631, filed Oct. 6, 2011, both of which are incorporated by reference herein in their entirety.

BACKGROUND

Field of Disclosure

This disclosure relates in general to the field of digital video and in particular to the objective measurement of digital video quality and the implementation of the measurement in a real time video codec.

Description of the Related Art

Raw digital video streams often consume immense digital storage space, and are prohibitively massive for transmission. To reduce storage space or transmission bandwidth requirements, a raw video stream is encoded to reduce its size. Typical video encoding involves the process of subtracting a reference frame from an original frame of video to obtain a residual frame containing less information than the original frame. Residual frames are then further processed to obtain a compressed digital video stream for transmission or storage. A typical video decoder receives the compressed digital video stream and decompresses the compressed digital video into the original video stream or a downgraded version of the digital video stream.

In the field of video coding, the real-time estimation of the visual quality of previously encoded video frames in a compressed video stream is an important consideration in encoding subsequent video frames in the same video stream. The visual quality of encoded video is an objective measure of how the encoded video appears to a viewer. Poor video visual quality is characterized by an image display that appears unnatural to human perception. Examples of instances of poor video visual quality include compression artifacts (e.g., blocking, contouring, mosquito noise, and "digitized" video appearance), discoloration, inconsistent contrasting, and inconsistent resolution display. The visual quality of encoded video can be improved by altering the encoding and compression process if the video encoder detects the poor visual quality of previously encoded video frames. Determining the visual quality of encoded video frames in real-time may help an encoder in effectively improving the visual quality of encoded video.

One common method of measuring encoded video frame visual quality is to determine the peak signal-to-noise ratio (psnr) of the frame. psnr is a non-ideal solution, because although psnr can be computed real-time, psnr correlates poorly with human perception. Other measures, such as the structural similarity index metric (ssim), visual information fidelity (vif), and the multi-scale structural similarity index metric (mssim) cannot practically be computed in real-time due to their computational complexity, limiting their usefulness in distortion control feedback applications of video encoders. In addition, ssim, vif, and mssim can only be computed in the pixel domain, furthering limiting their utility.

SUMMARY

Embodiments relate to a method and system for measuring the visual quality of a processed image. A processed image is received, and a measure of discrepancy is determined between a part of the processed image and a corresponding part of a corresponding unprocessed image. The measure of discrepancy may be a mean square error. Variance information is determined for the processed image and for the unprocessed image. A measure of the visual quality of the processed image is then determined based on the measure of discrepancy and the variance information.

In one embodiment, visual quality is measured for more than one part of a processed image and averaged to determine the measure of visual quality of the entire processed image. In one embodiment, visual quality is based on adaptation constants which are selected to increase correlation between the measure of visual quality and human perception. The measure of discrepancy and the variances may be determined in the pixel domain or in the transform domain, or may be predicted in the event that the processed image is unavailable. The measure of visual quality may be used in a feedback loop by an image processor to alter the processing of subsequent images in a video sequence.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Embodiments relate to generating a measure of visual quality of processed images relative to unprocessed images in real-time. The measure of visual quality closely correlates with a human's actual perception of the processed image relative to the original image. The measure of visual quality is computed based on a measure of discrepancy (e.g., mean square errors) between the processed and unprocessed images and the variance of each image in the pixel domain or the transform domain may be determined. If the processed image is unavailable, a prediction of the processed image may be used in place of the processed image. In one embodiment, a prediction of a processed image comprises predictions of the variance values for processed image blocks. The visual quality measure may be used in a feedback loop to improve processing or encoding.

Processing of images described herein includes encoding digital video frames. Such processing may involve, for example, lossy compression that may result in a processed image non-identical to or of poorer quality than a corresponding original image. The visual quality measure described herein refers to an index or parameter indicative of the level of distortion in a displayed image relative to the original image perceivable to a viewer. In the context of determining the visual quality of an encoded video frame, reference to both an original image and a distorted image implies the association that a particular distorted image is the result of encoding and decoding a particular original image. Further, reference to the visual quality of "encoded video" refers both to a single encoded video frame, or multiple encoded video frames.

Video frames described herein refer to images that when displayed consecutively form motion video. The video frames may be referred to as either frames or images interchangeably. Video frames that have undergone encoding may be referred to as either encoded or compressed video frames. Video compression often results in the loss of video data, and thus decompressed frames may be referred to as distorted frames herein.

A block described herein refers to a group of pixels within an image in a spatial pixel domain or a group of coefficients in a transform domain. In a spatial pixel domain, a block may include information about luminance or chrominance values for a set of pixels. A block may be a group of pixels of any size (e.g., 4×4 pixels or 8×8 pixels) in the spatial pixel domain. In a transform domain, blocks may be a group of transform coefficients of any size within an image. Block size in both pixel and transform domains may be dependent on the size of the transform applied to an image. Blocks may vary in size within a single image, or may be constant in size.

Pixel domain as described herein implies operations on or functionality involving images which may be represented by spatial pixel information. The term "pixel mode" implies operation or functionality within the spatial pixel domain. Transform domain as described herein implies operations on or functionality involving images which have undergone transformation from the spatial pixel domain into another domain, such as the frequency domain, and which may be represented by coefficient information. The term "transform mode" implies operation or functionality within the transform domain. Prediction mode as described herein implies operation or functionality external to encoding and decoding which estimates the visual quality of encoded video independently of the method or process used to produce the encoded video.

Overview of Process for Computing Visual Quality

Figure 1:
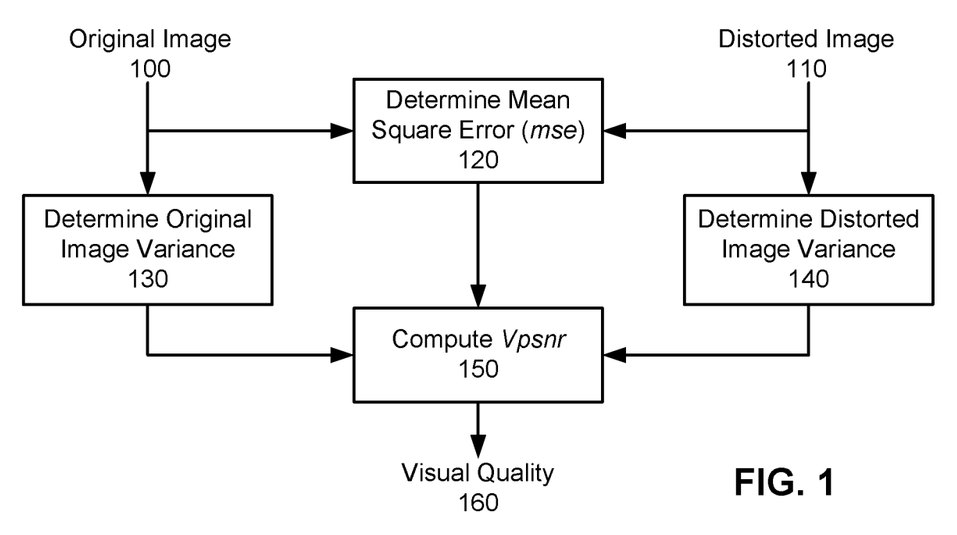
FIG. 1 is a flowchart illustrating a method of determining the visual quality of an encoded video frame using Visual Peak Signal-to-Noise Ratio (vpsnr), according to one embodiment.

FIG. 1 is a flowchart illustrating a method of determining the visual quality of an encoded video frame using Visual Peak Signal-to-Noise Ratio (vpsnr), according to one embodiment. In the embodiment of FIG. 1, the visual quality 160 of distorted image 110 relative to original image 100 is determined based on a series of computations. In one embodiment, where the distorted image 110 is not available, an estimation or prediction of the distorted image 110 may be used instead in determining the visual quality measure 160 between two video frames. The series of computations include determining 120 the mean square error (mse) of the original image and the distorted image.

An mse generally is a measure of discrepancy quantifying the difference between an estimator and the actual value of the quantity being estimated. The mse in the context of images comprises the average of the squared difference between an estimator image (e.g., the distorted image 110) and the actual image being estimated (e.g., the original image 100). The mse between non-overlapping corresponding blocks in the two images may be determined 120 in the spatial pixel domain or the transform domain. In instances where a distorted image 110 is not available, the mse may be determined 120 by using other methods, discussed below in detail with regards to FIGS. 3 and 8. The mse may be determined 120 for an entire image, for one or more blocks within an image, or for every block within an image.

The series of computations also include determining 130 the variance of blocks in the original image 100 (hereinafter referred to as "the variances of the original image"), and determining 140 the variance of blocks in distorted image 110 (hereinafter referred to as "the variances of the distorted image"). A variance generally is a measure of how widely distributed a set of information or data is. Variance may be determined by averaging the squared deviation of data from the mean of the data's distribution for each individual datum in the set of data. In the context of images, variance may be a measure of the extent of distribution of any characteristic or property of an image block. For instance, the variance may be determined for the color distribution of a block, the brightness of the block, the contrast of the block, or any other image block property. Further, the variance for an image block may be determined in the pixel domain or the transform domain.

If the distorted image 110 is not available, the variances for the distorted image 110 may be determined 140 by using other methods, discussed below in detail with regards to FIG. 3 and FIG. 8. The variances of an image may be determined for an entire image, for one or more blocks within an image, or for every block within an image. In the examples described below in detail with reference to equations (1) through (13), the variances may be determined for every non-overlapped block within the image.

After the mse is determined, the variances of the original image and the variances of the distorted image are determined, the Visual Peak Signal-to-Noise Ratio ("vpsnr") is computed 150. The vpsnr is computed 150 based on the Visual Mean Squared Error ("vmse"), which is computed based on the mse, the variances of the original image, and the variances of the distorted image, and may be computed based on adaptation constants, which are discussed below in greater detail in regards to FIGS. 6 through 8. The vmse may be computed for the entirety of the original image 100 and the distorted image 110, or for one or more blocks or portions of original image 100 and distorted image 110.

In one embodiment, the process of computing 150 vpsnr includes computing the vmse for each of the plurality of blocks of the original image 100 and the corresponding blocks of the distorted image 110, and averaging the computed vmse values. Alternatively, the vpsnr may be computed 150 by computing the vmse for a subset of the plurality of blocks of the original image 100 and the corresponding blocks of the distorted image 110. The output of the method is the visual quality 160 of the distorted image 110 relative to the original image 100. The visual quality 160 may be a unit-less ratio of distortion between the distorted image 110 and the original image 100, or may comprise any suitable measurement unit.

vpsnr may be computed in real-time, unlike alternative methods of determining visual quality. Further, as is noted in Table 1 below, vpsnr correlates with human perception better than many alternative methods of determining visual quality. Finally, vpsnr allows the flexibility of determining a measure of visual quality of processed images in the pixel mode, the domain mode, or in circumstances where the processed image is unavailable.

Example Operating Environment

Figure 2:
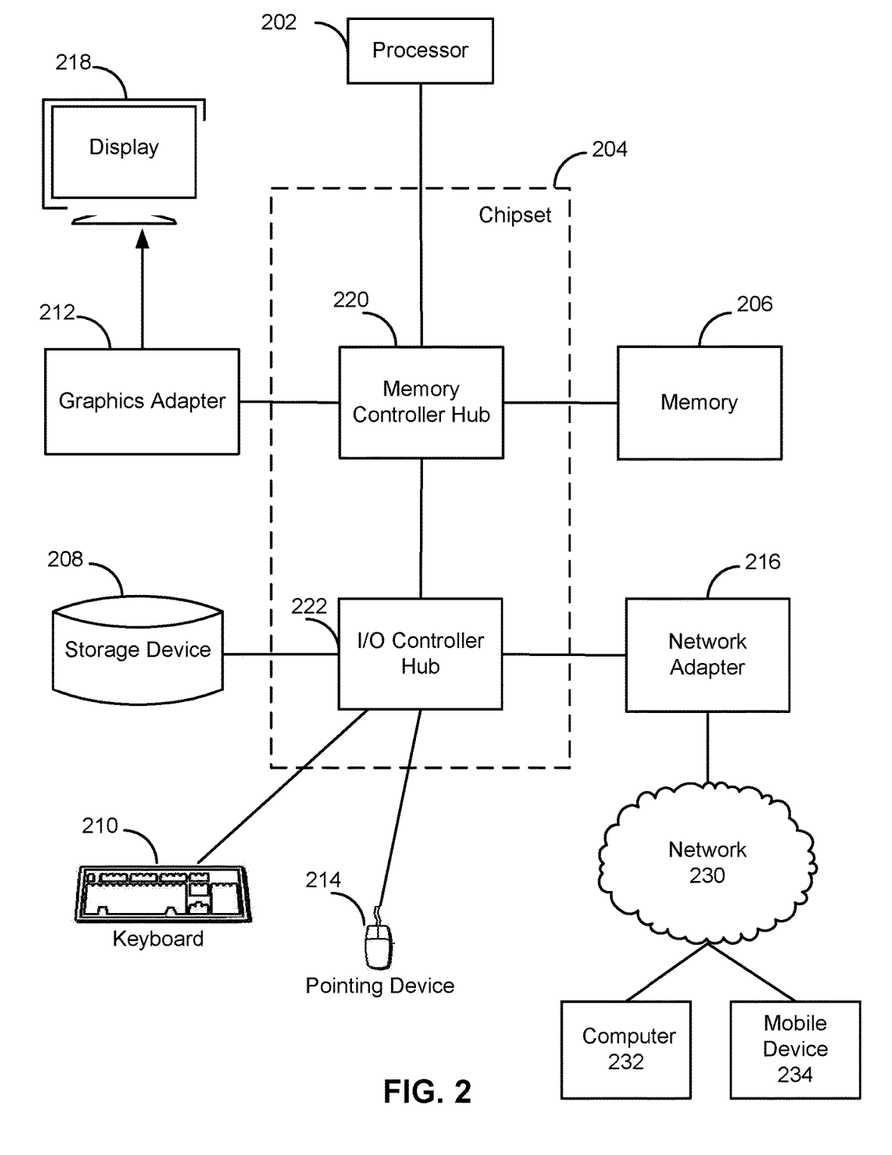
FIG. 2 is a high-level block diagram illustrating a typical environment for determining the visual quality of encoded video using vpsnr, according to one embodiment.

FIG. 2 is a high-level block diagram illustrating a typical environment for determining the visual quality of encoded video using vpsnr, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. The network adapter 216 is communicatively coupled to computer 232 and mobile device 234 through network 230. A display 218 is coupled to the graphics adapter 212. In one embodiment, the functionality of the chipset 204 is provided by a memory controller hub 220 and an I/O controller hub 222.

In another embodiment, the memory 206 is coupled directly to the processor 202 instead of the chipset 204, or is located within processor 202, such as in a system-on-a-chip environment. In such embodiments, the operating environment may lack certain components, such as chipset 204, storage device 208, keyboard 210, graphics adapter 212, pointing device 214, network adapter 216 and display 218. Processor 202 may be a special-purpose dedicated processor, such as an Application-Specific Integrated Circuit (ASIC), or a customizable general-purpose processor, such as a Field-Programmable Gate Array (FPGA). Processor 202 may also be embodied as a commercially available Central Processing Unit (CPU) or (Graphics Processing Unit (GPU), with one or more processor cores.

The storage device 208 is a non-transitory computer-readable storage medium, such as a hard drive, compact disk read-only memory (CD-ROM), DVD, or a solid-state memory device. The memory 206 may contain, among other data, instructions and data used by the processor 202. The pointing device 214 is a mouse, track ball, or other type of pointing device, and is used in combination with the keyboard 210 to input data into the computer system. The graphics adapter 212 displays images and other information on the display 218. The network 230 enables communications between the processor 202, computer 232 and mobile device 234. In one embodiment, the network 230 uses standard communications technologies and/or protocols and can include the Internet as well as mobile telephone networks.

Additional modules not illustrated in FIG. 2 may also be present in the operating environment. For instance, encoder modules, decoder modules, transform modules, or any other claimed module may be implemented by processor 202, chipset 204, memory 206, storage device 208, graphics adapter 212, or by an additional component not displayed such as a specialized hardware module to implement the functionality described below with regards to FIGS. 3 through 8, which may or may not be external to the computer. This description uses the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202.

Example Visual Quality Measure Determination and Application Environment

Figure 3:
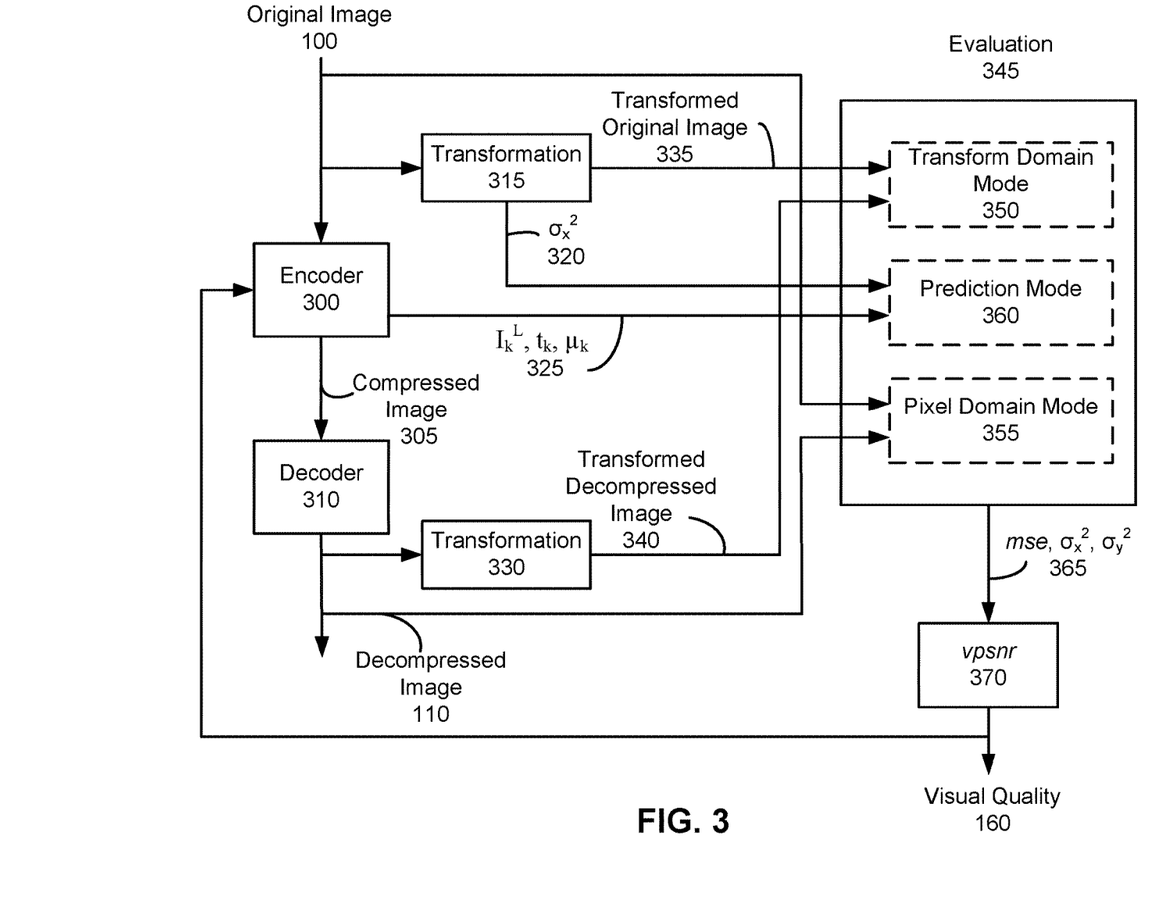
FIG. 3 is a high-level block diagram illustrating an environment for determining and applying a visual quality measure in a real time video codec in a transform domain mode, a pixel domain mode, or a prediction mode, according to one embodiment.

FIG. 3 is a high-level block diagram illustrating an environment for determining and applying the visual quality measure described in FIG. 1 in a real time video codec in a transform domain mode, a pixel domain mode, or a prediction mode, according to one embodiment. The environment of FIG. 3 may include, among other components, encoder 300, decoder 310, transformation modules 315 and 330, evaluation module 345 and vpsnr module 370. The environment of FIG. 3 may be implemented in, for example, the processor 202 and memory 206 of FIG. 2, or may be implemented in other components and/or modules In one embodiment, encoder 300 may be implemented in processor 202 and memory 206, and decoder 310 may be implemented in computer 232 or mobile device 234.

The encoder 300 of FIG. 3 receives an original image 100 from a storage medium or transmission interface, encodes the image (as described below in detail with regards to FIG. 4), and outputs a compressed image 305. The decoder 310 receives the compressed image 305 and decodes the image (as described below in detail with regards to FIG. 5), and outputs a decompressed image 110. In one embodiment, the encoder 300 and decoder 310 are implemented in the same processor, module, integrated circuit or computer. Alternatively, the encoder 300 and decoder 310 may be implemented in different computers or systems, and the compressed image 305 is transmitted via network 230. In such an embodiment, there may be more than one decoder; for instance, an encoding device may contain a decoder for feedback or distortion control and may transmit encoded video to a separate decoder for decoding and display. In one embodiment encoder 300 receives visual quality measure 160 and performs rate distortion control or other similar feedback techniques which may be used to alter the quality of encoded video based at least in part on the received visual quality measure 160.

The evaluation module 345 determines the mean square error (mse) between a coded image and an original image, the variances of an original image ($\sigma_x^2$), and the variances of a decompressed image ($\sigma_y^2$). In one embodiment, the evaluation module 345 may operate in one or more different modes, such as a transform domain mode 350, a pixel domain mode 355, and a prediction mode 360. These modes will be discussed below in greater detail with respect to FIGS. 6 through 8. In one embodiment, the evaluation module 345 operates in a single mode. In one embodiment, multiple evaluation modules may be used, each operating in a separate mode. Alternatively, the evaluation module 345 may operate in more than one mode simultaneously, providing more than one visual quality measure 160 simultaneously. In one embodiment, an evaluation module 345 may comprise separate modules for mse and variance determination functionality.

The evaluation module 345 may request and receive various inputs depending on the operating mode. For instance, the original image 100 and the decompressed image 110 may be transmitted to evaluation module 345. The original image 100 and decompressed image 110 may be provided in the form of pixels for an entire image, in the form of image blocks comprising pixels, in the form of image sub-blocks comprising one or more portions of an image block, or in any other form. In another embodiment, the transformed original image 335 and the transformed decompressed image 340 are transmitted to evaluation module 345. The transformed original image 335 and transformed decompressed image 340 may be provided in the form of coefficients for the entire image, in sets of coefficients, where each set represents an image block, or in any other format.

In one embodiment, variances $\sigma_x^2$ 320 (described below in detail with reference to equations (2) and (7)), and standard deviations of image block coefficients $\mu_k$, quantization invariants $I_k^L$, and quantization thresholds $t_k$ 325 (described below with regards to FIG. 8) may be transmitted to evaluation module 345. Variances $\sigma_x^2$ 320 and transformed original image 335 may be provided by transformation module 315. Transformation module 315 may be external or internal to encoder 300. For instance, encoder 300 may have a transformation module used in encoding which may provide the required values. Alternatively, a separate transformation module 315 may be used to separately compute these values. In one embodiment, a separate transformation module 315 may be required for existing encoder hardware or software incapable of separately outputting the required values.

The encoder 300 may produce and/or transmit standard deviations $\mu_k$, quantization invariants $I_k^L$, and quantization thresholds $t_k$ 325 to evaluation module 345. Alternatively, these values 325 may be provided by a source external to encoder 300. Each value 325 may be provided by a different source, or may be provided by the same source. Similarly, transformed decompressed image 340 may be provided by transformation module 330, which may be external or internal to decoder 310, or which may be external or internal to encoder 300. In one embodiment, transformation modules 315 and 330 may be implemented in the same module, or may be implemented with the same hardware or software components. Variances $\sigma_x^2$ 320, and standard deviations $\mu_k$, quantization invariants $I_k^L$, and quantization thresholds $t_k$ 325 will be discussed in greater detail below.

The vpsnr module 370 receives the determined mse, $\sigma_x^2$, and $\sigma_y^2$ 365 from the evaluation module 345 and computes the visual quality measure 160. In one embodiment, the vpsnr module 370 and the evaluation module 345 are implemented in the same module. In one embodiment, the visual quality measure 160 is transmitted to encoder 300.

Example Encoder and Decoder Architecture

Figure 4:
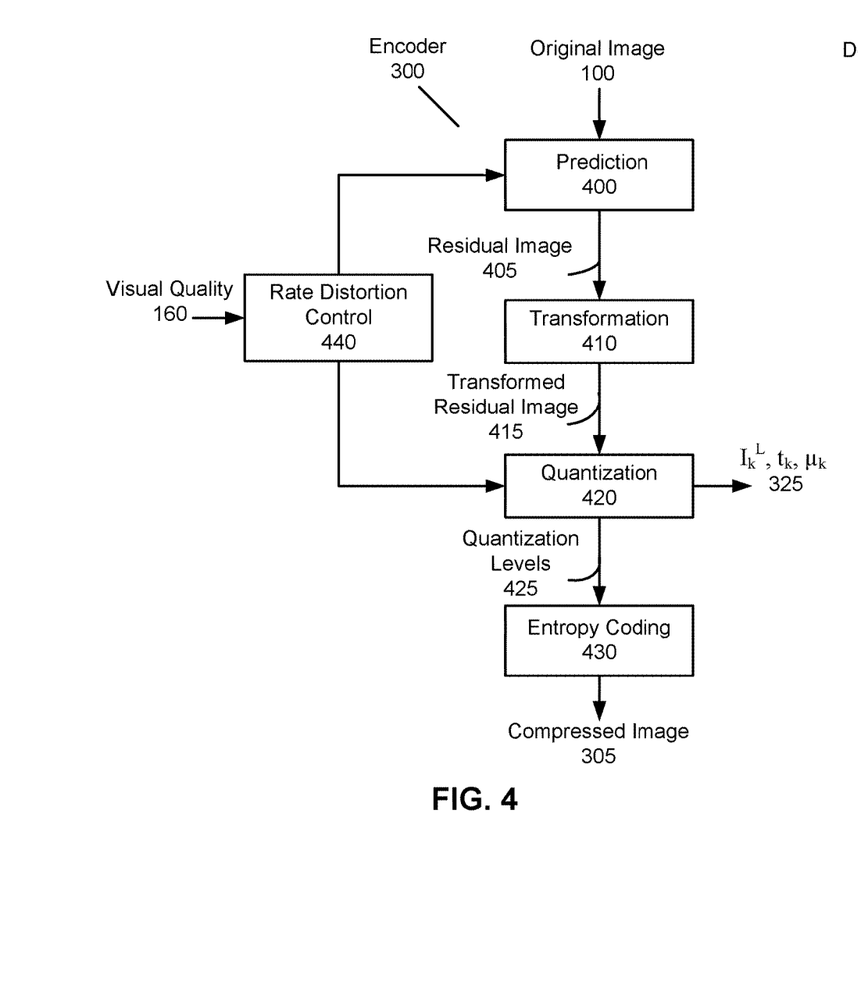
FIG. 4 is a block diagram illustrating a detailed view of modules within an encoder module according to one embodiment.

FIG. 4 is a high-level block diagram illustrating an encoder module 300 in detail, according to one embodiment. The encoder module 300 may include, among other components, prediction module 400, transformation module 410, quantization module 420, entropy coding module 430 and rate distortion control module 440. The functions described herein can be distributed among the modules in accordance with other embodiments in a different manner or by different entities than is described herein.

Prediction module 400 receives an original image 100 and performs image prediction by selecting a prediction image with similar features to the original image and subtracting the prediction image from the original image, resulting in a selected prediction image and a residual image 405. Image prediction may utilize spatial prediction (identifying objects, shapes, curves, lines, or any other characteristic of the original image similar to a characteristic in a prediction image), temporal prediction (identifying characteristics of frames preceding or following the original image, such as the motion of an object in the original frame), or any other suitable method of image prediction. For example, the prediction module 400 may use motion estimation and/or motion prediction to generate the prediction image as well known in the art.

The transformation module 410 receives the residual image 405 and applies a transform to produce coefficients in a transform domain (e.g., frequency domain). Example transforms may include a Discrete Cosine Transform (DCT) or a wavelet transform. In one embodiment, transformation module 410 produces a set of coefficients for each block of pixels (e.g., 4×4 pixels or 8×8 pixels). In one embodiment, sets of coefficient are produced for non-overlapping blocks of pixels. The transformed residual image 415 may comprise multiple sets of coefficients. For instance, the transformed residual image 415 comprises one set of coefficients for each image block.

Quantization module 420 receives the transformed residual image 415 and compresses the range of coefficient values to a single quantum value. In one embodiment, the transformed residual image 415 coefficients are divided by a selected quantization matrix, $Q_k$, and the resulting coefficient quotients ("quantization levels" 425) are rounded to the nearest integer. In one embodiment, a codec may have a set of quantization thresholds $t_k$ and quantization invariants $I_k^L$, where $I_k^L = L \cdot Q_k$, which are used to determine quantization levels 425. For instance, for a given transformed residual image 415 coefficient $\hat{r}_k$, where $I_k^L - (1-t_k) \cdot Q_k \leq \hat{r}_k < I_k^{L+1} - (1-t_k) \cdot Q_k$, $\hat{r}_k$ is mapped to quantization level L. Typically, quantization results in many higher frequency coefficients being rounded to zero, reducing the digital footprint of the image. Quantization module 420 may also determine and/or output quantization thresholds $t_k$ and quantization invariants $I_k^L$. In addition, quantization module 420 may determine and output the standard deviations $\mu_k$ of the transformed residual image 415 coefficients.

Entropy coding module 430 receives quantization levels 425 and compresses the quantization levels 425 to form compressed image 305. Entropy coding module 430 may utilize any lossless compression scheme independent of the specific characteristics of the coding medium. In one embodiment, entropy coding module 430 compresses the quantization levels 425 by replacing each fixed-length coefficient with a variable-length prefix codeword. The prefix codewords may be assigned to coefficient values based on the frequency of occurrence of coefficients. In such a scheme, the most common coefficients may be replaced with the shortest prefix codewords.

The encoder 300 may have a rate distortion control module 440, which may adjust steps in the encoding process to response to receiving a determined visual quality 160. For instance, the encoder 300 may determine that visual quality 160 of the compressed image 305 is undesirably low, indicating insufficient or inadequate encoding. Likewise, the encoder 300 may determine that visual quality 160 is unnecessarily high, indicating that fewer resources may be used in the encoding process.

In one embodiment, rate distortion control module 440 determines that the visual quality 160 is below a predetermined threshold. In this embodiment, rate distortion control module 440 may request that prediction module 400 select a prediction image from a larger collection or library of images. Likewise, rate distortion control module 440 may request that quantization module 420 adjust quantization thresholds $t_k$ and/or quantization invariants $I_k^L$ in order to preserve more image information when encoding future images. Similarly, rate distortion control module 440 may determine that visual quality 160 is above a pre-determined threshold. In such a situation, rate distortion control module 440 may request that prediction module 400 spend less time selecting a prediction image, or may request that quantization module 420 alter quantization thresholds $t_k$ and/or quantization invariants $I_k^L$ in order to preserve less image information. Additionally, rate distortion control module 440 may also request other modules and/or functionalities of the encoder to alter encoding performance in other ways. Further details of the rate disclosure control may be found in co-pending U.S. patent application Ser. No. 13/448,224, titled "Rate Distortion Optimization in Image and Video Encoding", filed on Apr. 16, 2012, the contents of which are hereby incorporated by reference.

Figure 5:
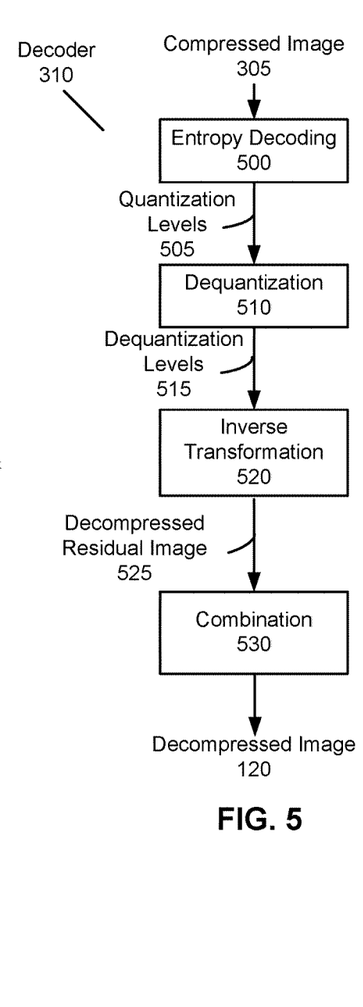
FIG. 5 is a block diagram illustrating a detailed view of modules within a decoder module according to one embodiment.

FIG. 5 is a high-level block diagram illustrating a detailed view of modules within a decoder module 310, according to one embodiment. The decoder may include, among components, entropy decoding module 500, dequantization module 510, inverse transformation module 520, and combination module 530. The functions described herein can be distributed among the modules in accordance with other embodiments in a different manner or by different entities than is described herein.

Entropy decoding module 500 receives compressed image 305 and performs entropy decoding on the compressed image 305 to produce quantization levels 505. In one embodiment, entropy decoding is accomplished by replacing prefixed codewords with fixed-length coefficients. Entropy decoding may require receiving a look-up table or other decoding key from encoder 300 or entropy coding module 430.

Dequantization module 510 receives the quantization levels 505 and produces dequantization levels 515. In one embodiment, quantization levels 505 are identical to quantization levels 425. Dequantization module 510 may multiply quantization levels 505 by a selected quantization matrix to produce dequantization levels 515. In one embodiment, the selected quantization matrices used by quantization module 420 and dequantization module 510 are identical.

Inverse transformation module 520 receives the dequantization levels 515 and produces the decompressed residual image 525. The dequantization levels 515 are image coefficients for the transform domain decompressed residual image, and the decompressed residual image 525 is a pixel domain image, and comprises pixel information. In one embodiment, the inverse transformation module 520 applies a DCT-related inverse transform to the dequantization levels 515.

Combination module 530 receives the decompressed residual image 525 and retrieves the associated prediction image. In one embodiment, the associated prediction image is a previously decoded image, and the encoder 300 transmits the location of the prediction image to the decoder 310. Combination module 530 combines the decompressed residual image 525 and retrieved prediction image to produce the decompressed image 120. The combination of the decompressed residual image 525 and the retrieved prediction image may comprise adding color values between a particular decompressed residual image 525 pixel and an associated prediction image pixel for each pixel in the decompressed residual image 525.

Example Visual Quality Determination

Figure 6:
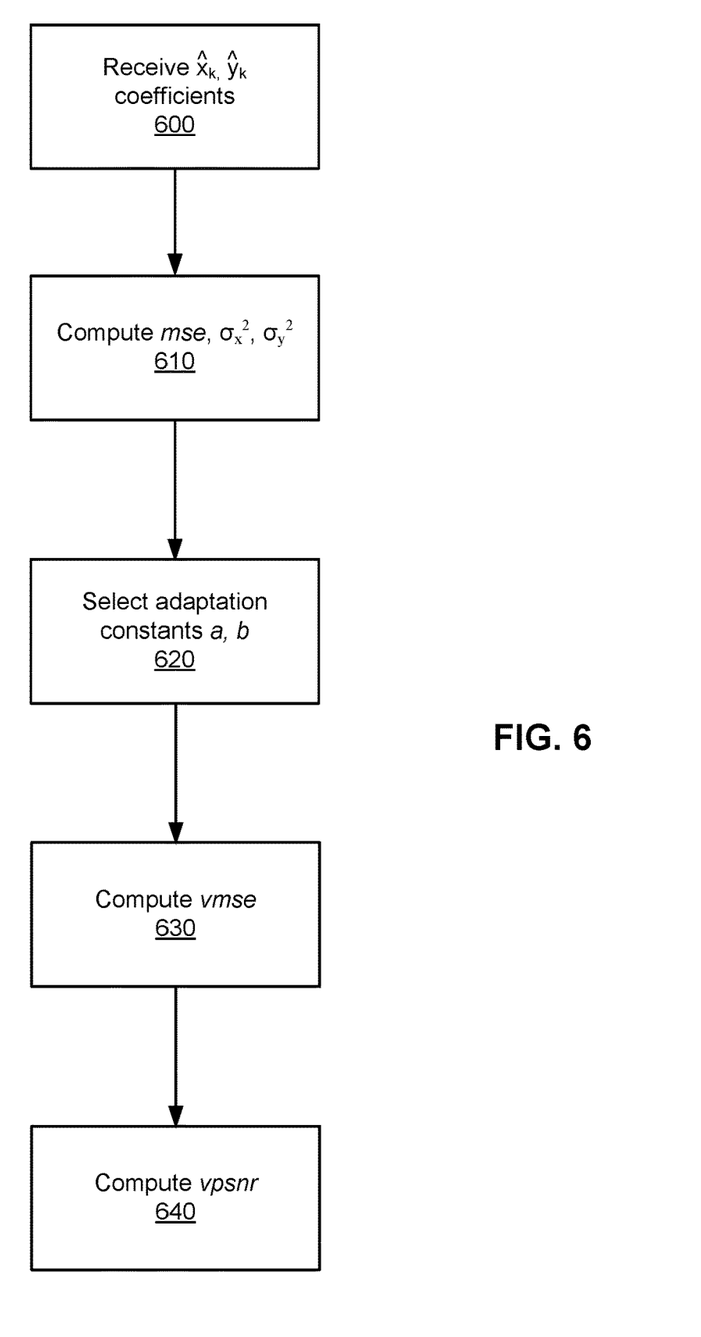
FIG. 6 is a flowchart illustrating a method of determining the visual quality of video in the transform domain, according to one embodiment.

FIG. 6 is a flowchart illustrating a method of determining the visual quality of video in the transform domain, according to one embodiment. In one embodiment, the method of FIG. 6 is performed by evaluation module 345 and vpsnr module 370, although some or all of the method can be performed by other modules in other embodiments.

The evaluation module 345 receives 600 coefficients $\hat{x}_k$ and $\hat{y}_k$. Coefficient $\hat{x}_k$ represents a set of transform domain coefficients of the original image 100. Coefficient $\hat{y}_k$ represents a set of transform domain coefficients of the distorted image 110. In one embodiment, one set of transform domain coefficients $\hat{x}_k$ of original image 100 and one set of transform domain coefficients $\hat{y}_k$ of distorted image 110 correspond to each non-overlapping pixel image block. The evaluation module 345 then computes 610 the transform domain mse, variance of the set of coefficients of the original image 100 ($\sigma_x^2$), and variance of the set of coefficients of the distorted image 110 ($\sigma_y^2$) for one or more blocks in the image.

In one embodiment, the transform domain mse is defined as:

$$mse = \frac{1}{n} \sum_{k=0}^{n-1} (\hat{x}_k - \hat{y}_k)^2 \qquad (1)$$

In equation (1), k is used as an index for transform domain coefficients in an image block, and n represents the total number of transform domain coefficients in an image block of a frame. Thus, in this embodiment, the mse is quadratic and is captured over a set of indices k by summing the squared difference between the transform domain coefficients of an original image 100 block and the associated transform domain coefficients of a corresponding distorted image 110 block, and dividing by n.

In one embodiment, the transform domain variance of the coefficients $\hat{x}_k$ of an original image 100 block is defined as:

$$\sigma_x^2 = \frac{1}{n-1} \sum_{k=1}^{n-1} (\hat{x}_k)^2 \qquad (2)$$

Similarly, the transform domain variance of the coefficients $\hat{y}_k$ of a distorted image 110 block is defined as:

$$\sigma_y^2 = \frac{1}{n-1} \sum_{k=1}^{n-1} (\hat{y}_k)^2 \qquad (3)$$

Variances $\sigma_x^2$ and $\sigma_y^2$ are quadratic and captured over a set of indices k by summing the squared transform domain coefficients for an original image 100 block and distorted image 110 block and dividing by n−1.

Adaptation constants a and b are selected 620 to increase the correlation between the computed visual quality measure and human perception. In one embodiment, a and b are selected to increase correlation with human perception of JPEG-compressed images. In one embodiment, correlation with human perception is determined by measuring the visual quality of encoded images retrieved from the Tampare Image Database, a database comprising 25 reference images and 1700 distorted images and various distortion levels optimized for visual quality comparison, and comparing the visual quality measurement to human perception marks stored in the database associated with the images. In one embodiment, for 4×4 and 8×8 pixel blocks, the adaptation constants are selected so that a=2 and b=1. The adaptation constants may be selected by evaluation module 345, by vpsnr module 370, or by any other module. More information on the Tampare Image Database may be found, for example, at http://www.ponomarenko.info/tid2008.htm.

The vmse is computed 630 for an image block by vpsnr module 370. In one embodiment, the vmse for an image block is defined as:

$$vmse = \frac{a \cdot mse}{a + b \cdot \sqrt{\sigma_x \sigma_y}} \quad (4)$$

The vpsnr is next computed 640 by the vpsnr module 370. In one embodiment, the vpsnr is defined as:

$$vpsnr = 10 \times \log_{10}\left(\frac{(2^N - 1)^2}{\overline{vmse}}\right) \quad (5)$$

In equation (5), N represents the number of bits used to represent a pixel per sample. In one embodiment, 8-bit samples are used, and $2^N-1=255$. Further, $\overline{vmse}$ is the mean of vmse values for all image blocks in the image.

In one embodiment, the computed vpsnr is outputted as the visual quality measure 160. In alternative embodiments, the computed vpsnr may be manipulated, such as by converting the vpsnr into a different unit of measurement prior to being outputted as the visual quality measure 160. Further, the vpsnr for multiple images may be computed and may be averaged prior to being outputted as visual quality measure 160.

Figure 7:
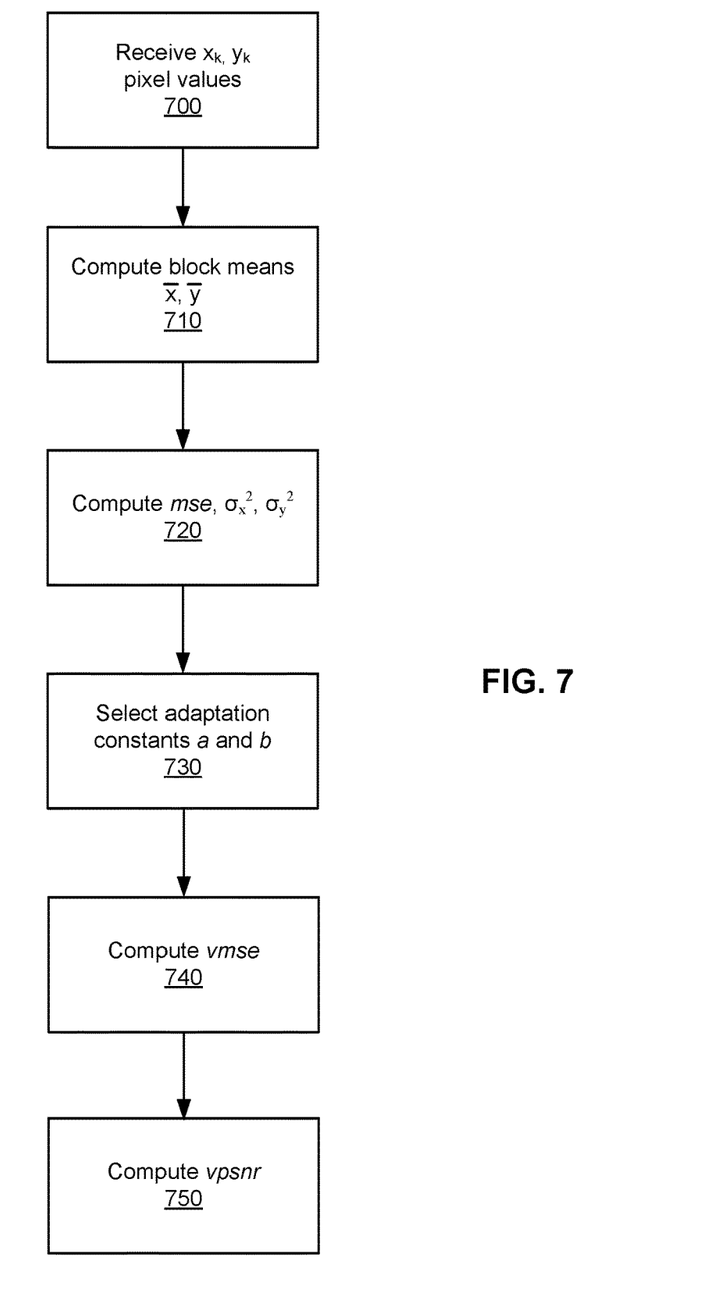
FIG. 7 is a flowchart illustrating a method of determining the visual quality of video in the pixel domain, according to one embodiment.

FIG. 7 is a flowchart illustrating a method of determining the visual quality of video in the pixel domain, according to one embodiment. In one embodiment, the method of FIG. 7 is performed by evaluation module 345 and vpsnr module 370, although some or all of the method can be performed by other modules in other embodiments.

The evaluation module 345 receives 700 $x_k$ and $y_k$. $x_k$ represents a set of pixel values of the original image 100. $y_k$ represents a set of pixel values of the distorted image 110. In one embodiment, one set pixel values $x_k$ of original image 100 and one set of pixel values $y_k$ of distorted image 110 correspond with each non-overlapping pixel image block. The evaluation module 345 next computes 710 the pixel value means $\bar{x}$ of an original image 100 block and the pixel value means $\bar{y}$ of a distorted image 110 block for one or more image block.

The evaluation module 345 then computes 720 the pixel domain mse, variance of pixel values of the original image 100 ($\sigma_x^2$), and variance of pixel values of the distorted image 110 ($\sigma_y^2$) for one or more blocks in the image. In one embodiment, the pixel domain mse is defined as:

$$mse = \frac{1}{n}\sum_{k=0}^{n-1} (x_k - y_k)^2 \quad (6)$$

In equation (6), k represents an index for pixels in a non-transformed image block, and n represents the total number of pixels in an image block of a frame. Thus, in this embodiment, the mse is quadratic and is captured over a set of indices k by summing the squared difference between the pixel values of an original image 100 block and the associated pixel values of an associated distorted image 110 block, and dividing by n, the total number of pixels for the block.

In one embodiment, the pixel domain variance of the pixel values of an original image 100 block is defined as:

$$\sigma_x^2 = \frac{1}{n-1}\sum_{k=0}^{n-1} (x_k - \bar{x})^2 \quad (7)$$

Similarly, the pixel domain variance of the pixel values of a distorted image 110 block is defined as:

$$\sigma_y^2 = \frac{1}{n-1}\sum_{k=0}^{n-1} (y_k - \bar{y})^2 \quad (8)$$

Variances $\sigma_x^2$ and $\sigma_y^2$ are quadratic and captured over a set of indices k by summing the squared differences between pixel values and pixel value means for an original image 100 block and distorted image 110 block, and dividing by n−1.

Adaptation constants a and b are selected 730 to increase the correlation between the computed visual quality measure and human perception. As discussed above, a and b may be selected to increase correlation with the human perception of JPEG-compressed images and correlation with human perception is determined by measuring the visual quality of encoded images retrieved from the Tampare Image Database. The vmse may be computed 740 for an image block using equation (4) and the vpsnr may be computed for the image using equation (5).

Figure 8:
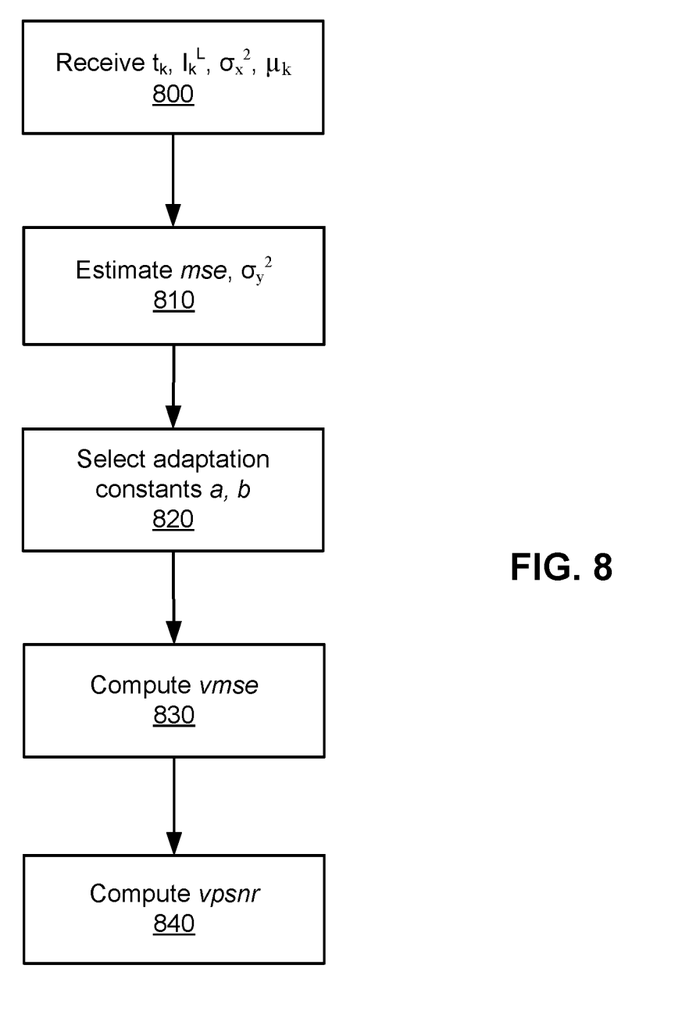
FIG. 8 is a flowchart illustrating a method of determining the visual quality of video in a prediction mode, according to one embodiment.

FIG. 8 is a flowchart illustrating a method of determining the visual quality of video in a prediction mode, according to one embodiment. In the event that neither pixel domain information nor transform domain information are available for a distorted image 110, it is possible to estimate visual quality 160 by transforming the original image 100, and analyzing the transformed original image and a corresponding transformed residual image 415. The operating mode of this method is referred to herein as the prediction mode. In one embodiment, the method of FIG. 8 is performed by evaluation module 345 and vpsnr module 370, although some or all of the method can be performed by other modules in other embodiments.

The evaluation module 345 receives 800 the quantization thresholds $t_k$ and quantization invariants $I_k^L$, described above in detail with reference to FIG. 3. In addition, the evaluation module 345 receives 800 variances $\sigma_x^2$ and $\mu_k$. In one embodiment, the variances $\sigma_x^2$ may be calculated by transformation module 315 in the transform or pixel domains with equation (2) or equation (7). In one embodiment, standard deviations $\mu_k$ are the standard deviations of coefficients within blocks of the transformed residual image 415. In one embodiment, evaluation module 345 receives the coefficients of the transformed original image 100 and transformed residual image 415 and computes variances $\sigma_x^2$ and standard deviations $\mu_k$.

The evaluation module 345 estimates 810 the mse, and the variance of a distorted image 110 block ($\sigma_y^2$) for one or more blocks in the image. In one embodiment, the mse is estimated as:

$$mse \approx \frac{1}{n}\sum_{k=0}^{n-1} \mu_k^2 + \frac{1}{n}\sum_{k=0}^{n-1} Q_k^2 \cdot \left(2t_k - 1 - \sqrt{2} \cdot \frac{\mu_k}{Q_k}\right) \cdot \frac{e^{\sqrt{2}\frac{Q_k \cdot t_k}{\mu_k}}}{e^{\sqrt{2}\frac{Q_k}{\mu_k}} - 1} \quad (9)$$

In equation (9), k represents an index for coefficients in an image block, and n represents the total number of coefficients in an image block.

In one embodiment, the variance of a distorted image 110 block is estimated as:

$$\sigma_y^2 \approx \sigma_x^2 + \frac{1}{n-1}\sum_{k=1}^{n-1}\mu_k^2 + \frac{1}{n-1}\sum_{k=1}^{n-1} Q_k^2 \cdot \left(2t_k - 1 - \sqrt{2} \cdot \frac{\mu_k}{Q_k}\right) \cdot \frac{e^{\sqrt{2}\frac{Q_k \cdot t_k}{\mu_k}}}{e^{\sqrt{2}\frac{Q_k}{\mu_k}} - 1} \quad (10)$$

Adaptation constants a and b are selected 820 to increase the correlation between the computed visual quality measure and human perception. As discussed above, a and b may be selected to increase correlation with the human perception of JPEG-compressed images and correlation with human perception is determined by measuring the visual quality of encoded images retrieved from the Tampare Image Database. The vmse estimate may be computed 740 for an image block using equation (4) and the vpsnr estimate may be computed for the image using equation (5).

The estimated values of mse and $\sigma_y^2$ do not require access to the distorted image 110, or even require creating a compressed image 305. Accordingly, the associated computed visual quality 160 does not require creating a compressed image 305. As a result, it is possible to produce an estimate of image visual quality 160 prior to or independent of encoder 300 receiving the original image 100 for encoding. In one embodiment, this "offline" visual quality 160 prediction is used in conjunction with determining visual quality 160 in pixel mode or transform mode. In one embodiment, predicting visual quality 160 for an original image 100 allows rate distortion control module 440 to adjust encoder 300 performance prior to encoding original image 100.

Example Visual Quality Determination Operating Modes

Table 1 displays the correlation with human perception for vpsnr and other measurements of visual quality. The correlation values for the alternative measurements of visual quality were obtained using the Tampare Image Database v1.0 (TID2008). The correlation value for vpsnr was computed and compared against the 25 reference images and the 1700 distortion images from TID2008. All measures of visual quality in Table 1 are with reference to JPEG and JPEG2000 formats.

TABLE 1

VPSNR VS. ALTERNATIVE MEASURES OF VISUAL QUALITY

| Measure | Correlation with Human Perception |
|---------|-----------------------------------|
| vpsnr   | 0.95                              |
| vif     | 0.75                              |
| vsnr    | 0.70                              |
| ssim    | 0.64                              |
| psnr    | 0.52                              |

Embodiments described herein allow the visual quality of processed images to be measured in a way that correlates better with human perception than other measures. As is evidenced in Table 1, vpsnr outperforms Visual Information Fidelity ("vif"), Visual Signal-to-Noise Ratio ("vsnr"), Structural Similarity Index Metric ("ssim"), and psnr in correlating with human perception. Further, the computations associated with implementing the embodiments are significantly less resource intensive than other methods which measure an image's visual quality. The visual quality measure can be used in a feedback loop of an image processor to improve the quality of image processing, as described above with regards to FIG. 4.

The above description is included to illustrate the operation of certain embodiments and is not meant to limit the scope of the disclosure. The scope of the disclosure is to be limited only by the following claims. From the above discussion, many variations will be apparent to one skilled in the relevant art that would yet be encompassed by the spirit and scope of the disclosure.

Some portions of above description describe the embodiments in terms of algorithmic descriptions and processes. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing a better measure of visual quality through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method comprising:
   accessing a first set of transform domain variances for a first image and a second set of transform domain variances for a second image, the second image comprising a decompressed representation of the first image;
   determining a mean squared error between the first image and the second image;
   accessing a set of adaptation constants; and
   computing a measure of visual quality of the second image based on the first and second sets of transform domain variances, the mean square error, the set of adaptation constants, and a number of bits that represent each pixel of the second image.

2. The method of claim 1, wherein computing the measure of visual quality of the second image comprises:
   computing a sub-measure of visual quality of the second image based at least in part on the first set of transform domain variances, the second set of transform domain variances, the mean square error, and the set of adaptation constants; and
   computing the measure of visual quality of the second image based on the computed sub-measure of visual quality and the number of bits that represent each pixel of the second image.

3. The method of claim 2, wherein the sub-measure of visual quality comprises a visual mean squared error.

4. The method of claim 1, wherein the measure of visual quality comprises a visual peak signal-to-noise ratio.

5. The method of claim 1, wherein the accessed set of adaptation constants is selected based on based on a comparison of a first set of images and a second set of images, the second set of images comprising decompressed representations of the first set of images.

6. The method of claim 1, wherein computing the measure of visual quality of the second image comprises computing a sub-measure of visual quality for each of a plurality of blocks of the second image and averaging the computed sub-measures of visual quality to obtain the measure of visual quality.

7. The method of claim 1, wherein the measure of visual quality is used by an image processor in the comparison of the first image and the second image.

8. A system comprising:
   an image processor configured to:
      access a first set of transform domain variances for a first image and a second set of transform domain variances for a second image, the second image comprising a decompressed representation of the first image;
      determine a mean squared error between the first image and the second image;
      access a set of adaptation constants; and
      compute a measure of visual quality of the second image based on the first and second sets of transform domain variances, the mean square error, the set of adaptation constants, and a number of bits that represent each pixel of the second image.

9. The system of claim 8, wherein computing the measure of visual quality of the second image comprises:
   computing a sub-measure of visual quality of the second image based at least in part on the first set of transform domain variances, the second set of transform domain variances, the mean square error, and the set of adaptation constants; and
   computing the measure of visual quality of the second image based on the computed sub-measure of visual quality and the number of bits that represent each pixel of the second image.

10. The system of claim 9, wherein the sub-measure of visual quality comprises a visual mean squared error.

11. The system of claim 8, wherein the measure of visual quality comprises a visual peak signal-to-noise ratio.

12. The system of claim 8, wherein the accessed set of adaptation constants is selected based on based on a comparison of a first set of images and a second set of images, the second set of images comprising decompressed representations of the first set of images.

13. The system of claim 8, wherein computing the measure of visual quality of the second image comprises computing a sub-measure of visual quality for each of a plurality of blocks of the second image and averaging the computed sub-measures of visual quality to obtain the measure of visual quality.

14. The system of claim 8, wherein the measure of visual quality is used by an image processor in the comparison of the first image and the second image.

15. A non-transitory computer-readable storage medium storing executable computer program instructions for measuring a visual quality of a processed image, the instructions comprising instructions for:
   accessing a first set of transform domain variances for a first image and a second set of transform domain variances for a second image, the second image comprising a decompressed representation of the first image;
   determining a mean squared error between the first image and the second image;
   accessing a set of adaptation constants; and
   computing a measure of visual quality of the second image based on the first and second sets of transform domain variances, the mean square error, the set of adaptation constants, and a number of bits that represent each pixel of the second image.

16. The non-transitory computer-readable storage medium of claim 15, wherein computing the measure of visual quality of the second image comprises:
   computing a sub-measure of visual quality of the second image based at least in part on the first set of transform domain variances, the second set of transform domain variances, the mean square error, and the set of adaptation constants; and
   computing the measure of visual quality of the second image based on the computed sub-measure of visual quality and the number of bits that represent each pixel of the second image.

17. The non-transitory computer-readable storage medium of claim 16, wherein the sub-measure of visual quality comprises a visual mean squared error.

18. The non-transitory computer-readable storage medium of claim 15, wherein the measure of visual quality comprises a visual peak signal-to-noise ratio.

19. The non-transitory computer-readable storage medium of claim 15, wherein the accessed set of adaptation constants is selected based on based on a comparison of a first set of images and a second set of images, the second set of images comprising decompressed representations of the first set of images.

20. The non-transitory computer-readable storage medium of claim 15, wherein computing the measure of visual quality of the second image comprises computing a sub-measure of visual quality for each of a plurality of blocks of the second image and averaging the computed sub-measures of visual quality to obtain the measure of visual quality.

21. The non-transitory computer-readable storage medium of claim 15, wherein the measure of visual quality is used by an image processor in the comparison of the first image and the second image.

* * * * *

UNITED STATES PATENT AND TRADEMARK OFFICE
CERTIFICATE OF CORRECTION

PATENT NO.         : 10,009,611 B2
APPLICATION NO.    : 15/093741
DATED              : June 26, 2018
INVENTOR(S)        : Alexander Tanchenko Page 1 of 1

It is certified that error appears in the above-identified patent and that said Letters Patent is hereby corrected as shown below:

In the Claims

Column 15, Lines 64-65, Claim 5, delete "is selected based on based on a comparison of" and insert --is selected based on a comparison of--.

Column 16, Lines 41-42, Claim 12, delete "is selected based on based on a comparison of" and insert --is selected based on a comparison of--.

Column 18, Line 3, Claim 19, delete "is selected based on based on a comparison of" and insert --is selected based on a comparison of--.

Signed and Sealed this
First Day of January, 2019

Andrei Iancu
*Director of the United States Patent and Trademark Office*